(12) United States Patent
Chihara et al.

(10) Patent No.: US 10,532,951 B2
(45) Date of Patent: Jan. 14, 2020

(54) SINTERED MATERIAL AND CUTTING TOOL INCLUDING SAME

(71) Applicant: Sumitomo Electric Industries, Ltd., Osaka-shi (JP)

(72) Inventors: Kentaro Chihara, Itami (JP); Satoru Kukino, Itami (JP); Akito Ishii, Itami (JP)

(73) Assignee: Sumitomo Electric Industries, Ltd., Osaka-shi (JP)

( * ) Notice: Subject to any disclaimer, the term of this patent is extended or adjusted under 35 U.S.C. 154(b) by 0 days.

(21) Appl. No.: 15/747,200

(22) PCT Filed: Jan. 5, 2017

(86) PCT No.: PCT/JP2017/000126
§ 371 (c)(1),
(2) Date: Jan. 24, 2018

(87) PCT Pub. No.: WO2017/203738
PCT Pub. Date: Nov. 30, 2017

(65) Prior Publication Data
US 2018/0215669 A1 Aug. 2, 2018

(30) Foreign Application Priority Data

May 27, 2016 (JP) .................. 2016-106471

(51) Int. Cl.
| C04B 35/119 | (2006.01) |
| C04B 35/596 | (2006.01) |
| C04B 35/599 | (2006.01) |
| B23B 27/14 | (2006.01) |
| C04B 35/597 | (2006.01) |
| B23F 21/00 | (2006.01) |
| B23G 5/06 | (2006.01) |
| C04B 35/58 | (2006.01) |
| C04B 35/584 | (2006.01) |
| C04B 35/587 | (2006.01) |
| C04B 35/645 | (2006.01) |
| C04B 35/488 | (2006.01) |

(52) U.S. Cl.
CPC .......... *C04B 35/597* (2013.01); *B23B 27/148* (2013.01); *B23F 21/00* (2013.01); *B23G 5/06* (2013.01); *C04B 35/488* (2013.01); *C04B 35/584* (2013.01); *C04B 35/587* (2013.01); *C04B 35/58014* (2013.01); *C04B 35/645* (2013.01); *B23B 2222/04* (2013.01); *C04B 2235/3208* (2013.01); *C04B 2235/3217* (2013.01); *C04B 2235/3225* (2013.01); *C04B 2235/3229* (2013.01); *C04B 2235/3232* (2013.01); *C04B 2235/3244* (2013.01); *C04B 2235/3246* (2013.01); *C04B 2235/3272* (2013.01); *C04B 2235/386* (2013.01); *C04B 2235/3839* (2013.01); *C04B 2235/3843* (2013.01); *C04B 2235/3847* (2013.01); *C04B 2235/3852* (2013.01); *C04B 2235/3865* (2013.01); *C04B 2235/3869* (2013.01); *C04B 2235/3873* (2013.01); *C04B 2235/3882* (2013.01); *C04B 2235/3886* (2013.01); *C04B 2235/405* (2013.01); *C04B 2235/656* (2013.01); *C04B 2235/785* (2013.01); *C04B 2235/786* (2013.01); *C04B 2235/80* (2013.01); *C04B 2235/85* (2013.01)

(58) Field of Classification Search
CPC ............ C04B 35/58014; C04B 35/584; C04B 35/597; B23B 27/148
See application file for complete search history.

(56) References Cited

U.S. PATENT DOCUMENTS

| 4,626,517 | A | * | 12/1986 | Watanabe ............ C04B 35/119 501/103 |
| 4,640,902 | A | | 2/1987 | Lange |
| 4,866,013 | A | * | 9/1989 | Anseau ................. C04B 35/481 501/96.5 |
| 8,814,965 | B2 | | 8/2014 | Yokoshi |
| 8,962,505 | B2 | | 2/2015 | Okamura et al. |
| 8,993,132 | B2 | | 3/2015 | Okamura et al. |
| 9,181,135 | B2 | | 11/2015 | Malik et al. |
| 9,856,175 | B2 | | 1/2018 | Okamura et al. |

(Continued)

FOREIGN PATENT DOCUMENTS

| DE | 3230216 A1 | 8/1983 |
| EP | 2520555 A1 | 11/2012 |
| JP | S62-030667 A | 2/1987 |
| JP | S63-252965 A | 10/1988 |
| JP | S64-051377 A | 2/1989 |
| JP | 64-065073 A | 3/1989 |
| JP | 2011-121822 A | 6/2011 |
| JP | 2011-140415 A | 7/2011 |
| JP | 2013-039668 A | 2/2013 |
| JP | 2014-520063 A | 8/2014 |

(Continued)

OTHER PUBLICATIONS

Written Opinion of the International Searching Authority in PCT International Application No. PCT/JP2017/000126, dated Mar. 7, 2017.

(Continued)

Primary Examiner — Karl E Group
(74) Attorney, Agent, or Firm — Baker Botts L.L.P.; Michael A. Sartori

(57) ABSTRACT

A sintered material includes a first material and a second material, the first material being partially stabilized $ZrO_2$ having a crystal grain boundary or crystal grain in which 5 to 90 volume % of $Al_2O_3$ is dispersed with respect to a whole of the first material, the second material including at least one of SiAlON, silicon nitride and titanium nitride, the sintered material including 1 to 50 volume % of the first material.

9 Claims, No Drawings

(56) References Cited

U.S. PATENT DOCUMENTS

| | | | |
|---|---|---|---|
| 9,988,314 B2* | 6/2018 | Danda | B23B 27/148 |
| 9,988,315 B2* | 6/2018 | Ishii | B23B 51/00 |
| 2010/0313489 A1 | 12/2010 | Teramoto et al. | |
| 2012/0208006 A1 | 8/2012 | Okamura et al. | |
| 2012/0304544 A1 | 12/2012 | Yokoshi | |
| 2012/0329632 A1 | 12/2012 | Malik et al. | |
| 2013/0079215 A1 | 3/2013 | Okamura et al. | |
| 2017/0197885 A1 | 7/2017 | Okamura et al. | |
| 2017/0197886 A1* | 7/2017 | Danda | B23B 27/148 |
| 2017/0233295 A1* | 8/2017 | Ishii | B23B 51/00 |
| | | | 501/134 |

FOREIGN PATENT DOCUMENTS

| | | | |
|---|---|---|---|
| JP | 2014-189474 A | 10/2014 | |
| WO | 2008/087940 A1 | 7/2008 | |
| WO | 2011/059020 A1 | 5/2011 | |
| WO | 2012/029440 A1 | 3/2012 | |
| WO | 2012/057183 A1 | 5/2012 | |
| WO | 2012/057184 A1 | 5/2012 | |
| WO | 2012/153645 A1 | 11/2012 | |

OTHER PUBLICATIONS

Yamamoto et al., "Fabrication of High Strength and Toughness Ceramics Using Pulsed Electric-Current Pressure Sintering of ZrO2(Y2O3)—Al2O3 Solid Solution Powders Prepared by the Neutralization Co-precipitation Method," Journal of the Japan Society of Powder and Powder Metallurgy, 2013, vol. 60, No. 10, pp. 428-435 [Cited in ISR and Written Opinion, w/ English Abstract].

Shibaya et al., "Fabrication of ZrO2 Solid Solution Ceramics Containing Al2O3 Having High Bending Strength ($\sigma b \geq 1$ GPa) and High Fracture Toughness ($KIC \geq 20$ MPa-m1/2) Simultaneously by Pulsed Electric-current Pressure Sintering (PECPS),"J. Jpn. Soc. Powder Powder Metallurgy, vol. 58, No. 12, p. 727-732, 2011 (Cited in Dec. 21, 2017 IDS in U.S. Appl. No. 15/327,214 and Feb. 16, 2017 IDS in U.S. Appl. No. 15/504,464).

Yamamoto et al., "Fabrication of High Strength and Toughness Ceramics Using Pulsed Electric-Current Pressure Sintering of ZrO2(Y2O3)—Al2O3 Solid Solution Powders Prepared by the Neutralization Co-precipitation Method," J. Jpn. Soc. Powder Metallurgy, vol. 60, No. 10, p. 428-435, 2013 (Cited in Dec. 21, 2017 IDS in U.S. Appl. No. 15/327,214 and Feb. 16, 2017 IDS in U.S. Appl. No. 15/504,464).

International Search Report of International Application No. PCT/JP2016/052127, dated Mar. 1, 2016.

International Search Report of International Application No. PCT/JP2016/062460 dated May 31, 2016.

International Search Report of International Application No. PCT/JP2016/055376, dated Apr. 5, 2016.

Notice of Allowance dated Apr. 10, 2018 in U.S. Appl. No. 15/327,214.

Notice of Allowance dated Feb. 7, 2018 in U.S. Appl. No. 15/327,214.

Notice of Allowance dated Sep. 29, 2017 in U.S. Appl. No. 15/327,214.

Notice of Allowance dated Sep. 5, 2017 in U.S. Appl. No. 15/324,182.

Notice of Allowance dated Apr. 10, 2018 in U.S. Appl. No. 15/504,464.

Notice of Allowance dated Feb. 13, 2018 in U.S. Appl. No. 15/504,464.

Non-Final Office Action dated Oct. 12, 2017 in U.S. Appl. No. 15/504,464.

* cited by examiner

SINTERED MATERIAL AND CUTTING TOOL INCLUDING SAME

TECHNICAL FIELD

The present invention relates to a sintered material and a cutting tool including the sintered material. The present application claims a priority based on Japanese Patent Application No. 2016-106471 filed on May 27, 2016. The entire content of Japanese Patent Application No. 2016-106471 is incorporated herein by reference.

BACKGROUND ART

A SiAlON has a structure in which aluminum (Al) and oxygen (O) are dissolved in silicon nitride ($Si_3N_4$) in a solid state. Normally, for the SiAlON, there have been known the following two types of crystalline structures: α-SiAlON and β-SiAlON, both of which belong to a hexagonal crystal structure. A SiAlON-based sintered material employing such a SiAlON has low reactivity with a metal and therefore has been developed as a material for cutting tools.

Each of Japanese Patent Laying-Open No. 2011-121822 (Patent Document 1) and Japanese Patent Laying-Open No. 2011-140415 (Patent Document 2) proposes a sintered material containing a cubic SiAlON (hereinafter, also referred to as "c-SiAlON") having a hardness higher than those of the α-SiAlON and the β-SiAlON in order to improve wear resistance when the sintered material is used as a cutting tool. Further, it has been known that titanium nitride (TiN) also exhibits very excellent wear resistance with respect to a heat-resistant alloy.

CITATION LIST

Patent Document

PTD 1: Japanese Patent Laying-Open No. 2011-121822
PTD 2: Japanese Patent Laying-Open No. 2011-140415

SUMMARY OF INVENTION

A sintered material according to one embodiment of the present invention includes a first material and a second material, the first material being partially stabilized $ZrO_2$ having a crystal grain boundary or crystal grain in which 5 to 90 volume % of $Al_2O_3$ is dispersed with respect to a whole of the first material, the second material including at least one of SiAlON, silicon nitride and titanium nitride, the sintered material including 1 to 50 volume % of the first material.

DESCRIPTION OF EMBODIMENTS

Problem to be Solved by the Present Disclosure

Cutting tools employing the above-described various types of sintered materials containing SiAlON, TiN, and the like exhibit excellent wear resistance in processing a difficult-to-cut material such as Inconel®; however, the cutting edges of such cutting tools may be chipped suddenly during cutting. Therefore, there is room for improvement in chipping resistance. The chipping of each of the cutting tools causes a serious problem in cutting airplane components or the like, which require high dimensional accuracy and surface quality.

The present invention has been made in view of the above-described circumstances, and has an object to provide a sintered material capable of exhibiting high chipping resistance in processing a difficult-to-cut material, as well as a cutting tool including the sintered material.

Advantageous Effect of the Present Disclosure

According to the description above, high chipping resistance can be exhibited in processing a difficult-to-cut material.

DESCRIPTION OF EMBODIMENTS OF THE INVENTION OF THE PRESENT APPLICATION

First, embodiments of the present invention are listed and described.

[1] A sintered material according to one embodiment of the present invention includes a first material and a second material, the first material being partially stabilized $ZrO_2$ having a crystal grain boundary or crystal grain in which 5 to 90 volume % of $Al_2O_3$ is dispersed with respect to a whole of the first material, the second material including at least one of SiAlON, silicon nitride and titanium nitride, the sintered material including 1 to 50 volume % of the first material. Such a sintered material is provided with high toughness and therefore can exhibit high chipping resistance in processing a difficult-to-cut material.

[2] Preferably, the $Al_2O_3$ has a grain size of not more than 1 μm. Accordingly, the toughness of the partially stabilized $ZrO_2$ can be improved.

[3] Preferably, the $Al_2O_3$ has a grain size of not more than 0.5 μm. Accordingly, the toughness of the partially stabilized $ZrO_2$ can be more improved.

[4] Preferably, the $Al_2O_3$ has a grain size of not more than 0.1 μm. Accordingly, the toughness of the partially stabilized $ZrO_2$ can be further improved.

[5] Preferably, both or one of the SiAlON and the silicon nitride have/has a cubic crystal structure. Accordingly, the hardness is increased, whereby the wear resistance can be improved.

[6] Preferably, both or one of the SiAlON and the silicon nitride further have/has at least one of an α crystal structure and a β crystal structure, and a peak intensity ratio Rc is not less than 20%, the peak intensity ratio Rc representing a ratio of an intensity of a main peak of an X-ray diffraction of the cubic crystal structure to a total of respective intensities of main peaks of X-ray diffractions of the α crystal structure, the β crystal structure, and the cubic crystal structure. Accordingly, a balance between the hardness and the toughness becomes excellent, thus achieving both high wear resistance and high chipping resistance.

[7] Preferably, each of the SiAlON and the silicon nitride is represented by $M_xSi_{6-x-z}Al_zO_zN_{8-z}$, the M includes at least one metal selected from a group consisting of calcium, strontium, barium, scandium, yttrium, lanthanoid, manganese, iron, cobalt, nickel, copper, a group 4 element, a group 5 element, and a group 6 element in a periodic table, and an atomic ratio of each of the elements of the $M_xSi_{6-x-z}Al_zO_zN_{8-z}$ satisfies $0.01 \leq x \leq 2$, $0 \leq z \leq 4.2$ and $1.79 \leq 6-x-z \leq 5.99$. This provides an effect resulting from solid solution of the M, which is a metal, or an effect of strengthening by dispersion thereof, thereby further improving the wear resistance.

[8] Preferably, the sintered material further includes a third phase, and the third phase is a compound composed of: at least one element selected from a group consisting of a group 4 element, a group 5 element, a group 6 element in a periodic table, boron, and Al; and at least one element selected from a group consisting of nitrogen, carbon, oxygen, and boron, or the third phase is a solid solution of the compound. Accordingly, sinterability can be improved, thereby further improving the strength.

[9] A cutting tool according to one embodiment of the present invention preferably includes the above-described sintered material. The cutting tool thus configured includes the above-described sintered material and therefore can exhibit high chipping resistance in processing such as high speed cutting of a difficult-to-cut material.

DETAILS OF EMBODIMENTS OF THE PRESENT INVENTION

The following describes an embodiment (hereinafter, also referred to as "the present embodiment") of the present invention more in detail.

Here, in the present specification, the expression "A to B" represents a range of upper to lower limits (i.e., not less than A and not more than B). When no unit is indicated for A and a unit is indicated only for B, the unit of A is the same as the unit of B. Moreover, when a compound or the like is expressed by a chemical formula in the present specification and an atomic ratio is not particularly limited, it is assumed that all the conventionally known atomic ratios are included. The atomic ratio is not necessarily limited only to one in the stoichiometric range. For example, when "TiAlN" is described, a ratio of atomic numbers in the TiAlN is not limited to Ti:Al:N=0.5:0.5:1, and includes all the conventionally known atomic ratios. The same also applies to compounds other than the "TiAlN". In the present embodiment, a metallic element and a nonmetallic element does not necessarily need to constitute a stoichiometric composition. Examples of the metallic element include titanium (Ti), aluminum (Al), silicon (Si), tantalum (Ta), or chromium (Cr). Examples of the nonmetallic element include nitrogen (N), oxygen (O), and carbon (C). In the present specification, the term "grain size" means an average grain size unless otherwise specified particularly.

<Sintered Material>

Conventionally, it has been known that when a sintered material including SiAlON, silicon nitride, titanium nitride, or the like is used as a cutting tool, the sintered material has excellent wear resistance particularly in cutting a Ni-based heat-resistant alloy. However, when finish-cutting a jet engine component for airplanes or the like, the tool may be suddenly chipped, disadvantageously.

However, according to research by the present inventor, surprisingly, it has been found that chipping resistance is improved significantly when fine $Al_2O_3$ is included in a specific manner in a sintered material composed of SiAlON, silicon nitride, or titanium nitride and partially stabilized $ZrO_2$, which is a high-toughness material. It is considered that the chipping resistance is improved significantly because the partially stabilized $ZrO_2$ having a structure made tough by the fine precipitated $Al_2O_3$ serves to suppress a crack propagating in the SiAlON, silicon nitride, or titanium nitride. Further, the above-described sintered material also has excellent wear resistance that is based on the SiAlON, titanium nitride, or the like.

The sintered material according to the present embodiment obtained based on such a finding includes a first material and a second material. The first material is partially stabilized $ZrO_2$ having crystal grain boundaries or crystal grains in which 5 to 90 volume % of $Al_2O_3$ is dispersed with respect to the whole of the first material. The second material includes at least one of SiAlON, silicon nitride and titanium nitride. The second material may include a plurality of components, such as a combination of SiAlON and titanium nitride, a combination of silicon nitride and titanium nitride, or a combination of SiAlON and silicon nitride, for example.

Such a sintered material may include any other component(s) as long as the sintered material includes the first material and the second material. Examples of the any other component(s) can include a below-described third phase. The sintered material may include an inevitable impurity as long as a desired effect is exhibited. On the other hand, the sintered material may be configured to include only both the first material and the second material. The following describes each of the components of the sintered material according to the present embodiment.

<First Material>

The first material is partially stabilized $ZrO_2$ having crystal grain boundaries or crystal grains in which 5 to 90 volume % of $Al_2O_3$ is dispersed with respect to the whole of the first material.

Here, the term "partially stabilized $ZrO_2$" has a conventionally known meaning, and typically refers to $ZrO_2$ having a cubic and tetragonal crystal structure that is stable or metastable at a room temperature by dissolving an oxide other than zirconia in a solid state to decrease oxygen holes in the structure and to result in stabilization thereof.

Examples of the oxide include calcium oxide and magnesium oxide as well as a rare earth oxide such as yttrium oxide. The partially stabilized $ZrO_2$ can include one or two or more such oxides. An amount of solid solution of the oxide(s) other than zirconia is about 1 to 4 mol % with respect to the $ZrO_2$.

Such partially stabilized $ZrO_2$ includes 5 to 90 volume % of $Al_2O_3$ with respect to the whole of the partially stabilized $ZrO_2$. More preferably, such partially stabilized $ZrO_2$ includes 15 to 30 volume % of $Al_2O_3$ with respect to the whole of the partially stabilized $ZrO_2$. Since the first material has such a configuration, characteristics, such as high hardness, high strength, and high toughness, can be obtained, thus allowing for high-speed cutting of a difficult-to-cut material. When the content of the $Al_2O_3$ is less than 5 volume %, the above characteristics cannot be obtained, whereas when the content of the $Al_2O_3$ is more than 90 volume %, the toughness is decreased significantly.

5 to 90 volume % of the included $Al_2O_3$ with respect to the whole of the partially stabilized $ZrO_2$ exist in a dispersed manner in the crystal grain boundaries or crystal grains of the partially stabilized $ZrO_2$. That is, the expression "exist in a dispersed manner" means that fine $Al_2O_3$ grains exist in crystal grain boundaries or crystal grains. The $Al_2O_3$ is preferably a grain (crystal grain) of not more than 1 μm, is more preferably a grain of not more than 0.5 μm, and is further preferably a grain of not more than 0.1 μm. As the grain size becomes smaller, the toughness tends to be improved. Hence, the lower limit of the grain size is not particularly limited; however, too fine grains lead to decreased toughness of the material itself. Hence, the lower limit of the grain size is preferably not less than 0.005 μm.

In addition, the grain size of the $Al_2O_3$ has such a feature that the grain size is changed depending on a sintering condition. Moreover, the grain size of the $Al_2O_3$ is changed even under the same sintering condition between a case where only the first material is sintered and a case where the first and second materials are mixed and sintered. Namely, in comparison between the grain size of the $Al_2O_3$ when only the first material is sintered and the grain size of the $Al_2O_3$ when the first and second materials are mixed and sintered, the grain size of the latter (i.e., $Al_2O_3$ in the sintered material including the first and second materials) becomes a fine grain size (crystal grain size) about $\frac{1}{10}$ of the grain size of the former (i.e., $Al_2O_3$ only in the case of the first material) even though the same sintering conditions (temperature, pressure, and the like) are employed.

In addition, the grain size of the $Al_2O_3$ is influenced particularly by pressure of the sintering conditions. In order to precipitate fine $Al_2O_3$, it is preferable to perform sintering under an ultra-high pressure condition.

The ultra-high pressure in the present embodiment means a pressure of not less than 3 GPa. In the present embodiment, the pressure for the sintering is preferably not less than 4 GPa and is more preferably not less than 5 GPa. The upper limit value of the pressure for the sintering is 7 GPa in view of structures of general ultra-high pressure pressing devices.

The appearance of the grain size (crystal grain size) of the $Al_2O_3$ of not more than 0.1 µm is a specific phenomenon occurring when the first and second materials are mixed and are sintered under the above-described ultra-high pressure condition. When only the first material is included and the second material is not included in the sintered material, the grain size of the $Al_2O_3$ does not become not more than 0.1 µm (normally, the grain size becomes more than 0.2 µm).

Thus, the fine $Al_2O_3$ dispersed in the first material provides significantly improved toughness presumably due to the structure being made tough by the $Al_2O_3$. Further, the $Al_2O_3$ can exist in one or both of a crystal grain boundary and a crystal grain. In other words, this means that the location of existence of the $Al_2O_3$ is not limited to a specific portion of the partially stabilized $ZrO_2$.

The grain size, content (volume %), and location of existence of the $Al_2O_3$ can be identified as follows. Specifically, the sintered material is subjected to a CP (Cross Section Polisher) process using an ion beam, thereby forming a smooth cross section. Next, the cross section is observed using a scanning electron microscope (SEM), thereby specifying the location of existence of the $Al_2O_3$. Based on the microscope image obtained by the SEM, a binarization process is performed using image analysis software to calculate equivalent circle diameter and area of the $Al_2O_3$. The equivalent circle diameter can be regarded as the grain size and the area can be regarded as the content. In the present specification, the term "equivalent circle diameter" refers to the diameter of an imaginary circle formed to have an area comparable to the area of the measured object calculated by the binarization process employing the image analysis software.

Here, the grain size (equivalent circle diameter) of the $Al_2O_3$ is an average grain size. This average grain size can be calculated as follows: a total of ten microscope images are captured at each of locations of existence of the $Al_2O_3$; these microscope images are subjected to the binarization process employing the image analysis software to calculate 50 equivalent circle diameters of the first material from each of the microscope images (therefore, a total of 500 equivalent circle diameters of the first material are calculated, i.e., 10 microscope images×50 equivalent circle diameters); and the average value thereof is calculated.

The first material can be obtained using a below-described neutralization co-precipitation method or a sol-gel method, for example.

(Neutralization Co-Precipitation Method)

The neutralization co-precipitation method is a method including the following steps A and B. Such a method is described in a paper (J. Jpn. Soc. Powder Powder Metallurgy, Vol. 60, No. 10, P428-435) published in 2013, for example.

Step A is a step of preparing a mixed solution by using zirconium salt, yttrium salt, and aluminum salt such that a molar ratio of zirconia ($ZrO_2$) and yttria ($Y_2O_3$) is 98.2:1.8 to 98.8:1.2 and a molar ratio of zirconia having added yttria and alumina ($Al_2O_3$) is 50:50 to 90:10. Here, the yttria ($Y_2O_3$) is illustrated as an oxide dissolved in the zirconia ($ZrO_2$) in a solid state; however, the oxide is not limited only to this.

Step B is a step of preparing $Y_2O_3$-stabilized $ZrO_2$—$Al_2O_3$ solid solution powder by: neutralizing the mixed solution obtained in step A by adding alkali thereto to obtain a precipitate by way of co-precipitation of zirconium, yttrium, and aluminum; drying the precipitate; performing heat treatment at 650 to 750° C. for 7 to 12 hours; and then performing calcination at 850 to 950° C. for 0.5 to 3 hours.

Examples of the zirconium salt of step A described above include zirconium oxychloride ($ZrOCl_2$), zirconium oxynitrate ($ZrO(NO_3)_2$), and the like. Examples of the yttrium salt include yttrium chloride ($YCl_3$), yttrium nitrate ($Y(NO_3)_3$), and the like. Examples of the aluminum salt include aluminum chloride ($AlCl_3$) and the like. Moreover, examples of a solvent for the mixed solution include nitric acid, hydrochloric acid, and the like.

(Sol-Gel Method)

The sol-gel method is a method including the following step X. Such a method is described in the paper (J. Jpn. Soc. Powder Powder Metallurgy, Vol. 58, No. 12, P727-732) published in 2011, for example.

Step X is a step of preparing crystalline $ZrO_2$ solid solution powder by: preparing amorphous solid solution powder of $ZrO_2$ having 0.3 to 1.7 mol % of $Y_2O_3$ added thereto, i.e., $ZrO_2$ (99.7 to 98.3 mol % of $ZrO_2$-0.3 mol % to 1.7 mol % of $Y_2O_3$)-10 to 50 mol % of $Al_2O_3$ using the sol-gel method; and calcinating the obtained amorphous solid solution powder at a temperature not less than a crystallization temperature.

The sintered material according to the present embodiment preferably include 1 to 50 volume % of the first material. When the content of the first material is less than 1 volume %, the improvement in chipping resistance by the addition of the first material cannot be not expected. When the content of the first material is more than 50 volume %, the hardness is decreased to presumably result in decreased wear resistance. A more preferable ratio of the first material in the sintered material is 2 to 20 volume %.

Further, the first material preferably has an average grain size of 0.01 to 1 µm. If the average grain size of the first material is less than 0.01 µm, the first material is likely to be aggregated when mixed with other powders such as SiAlON, silicon nitride, and titanium nitride, thus resulting in a tendency of insufficient sintering. If the average grain size of the first material is more than 1 µm, the strength tends to be decreased due to grain growth during the sintering. A more preferable average grain size of the first material is 0.1 to 0.5 µm.

The average grain size of the first material can be identified as follows, for example. Specifically, the sintered material is subjected to a CP process using an ion beam, thereby forming a smooth cross section. Next, the cross section is observed using a scanning electron microscope (SEM) to obtain 10 microscope images. Further, from each microscope image, 20 equivalent circle diameters of the first material are calculated by a binarization process employing image analysis software (therefore, a total of 200 equivalent circle diameters of the first material are calculated, i.e., 10 microscope images×20 equivalent circle diameters of the first material), and the average value thereof can be regarded as the average grain diameter. Thus, in the present specification, the average value of the equivalent circle diameters of the first material is regarded as the average grain size of the first material.

The composition and content ratio of each of the components, inclusive of the first material, of the sintered material according to the present embodiment can be identified by: a reflection electron image obtained by measuring a CP-processed surface by an SEM; an analysis by an energy dispersive X-ray spectroscopy (EDX) device; or an Auger electron spectroscopy analysis.

<Second Material>

In the sintered material according to the present embodiment, the second material includes at least one of SiAlON, silicon nitride and titanium nitride. Each of the SiAlON, the silicon nitride, and the titanium nitride preferably has an average grain size of 0.1 to 5 µm. If the average grain size is less than 0.1 µm, the second material is likely to be aggregated when mixed with other powders such as the first material, thus resulting in a tendency of insufficient sintering. If the average grain size is more than 5 µm, the strength tends to be decreased due to grain growth during the sintering. A more preferable average grain size of the second material is 0.5 to 2 µm.

The average grain size of the SiAlON, the silicon nitride, and the titanium nitride can be calculated as follows. Specifically, the sintered material is subjected to a CP process using an ion beam, thereby forming a smooth cross section. Next, the cross section is observed by an SEM to obtain 10 microscope images. Further, from each microscope image, by a binarization process employing image analysis software, 50 equivalent circle diameters of the SiAlON, the silicon nitride, and the titanium nitride are calculated (therefore, a total of 500 equivalent circle diameters of the SiAlON, the silicon nitride, and the titanium nitride are calculated, i.e., 10 microscope images×50 equivalent circle diameters), and the average value thereof can be regarded as the average grain size. Thus, in the present specification, the average value of the equivalent circle diameters of the second material is regarded as the average grain size of the second material.

Here, in the sintered material, both or one of the SiAlON and the silicon nitride preferably have/has a cubic crystal structure. The cubic SiAlON and the cubic silicon nitride have characteristics intrinsic to SiAlON and silicon nitride, i.e., low reactivity with a metal. Moreover, each of the cubic SiAlON and the cubic silicon nitride has a higher hardness than those of α-SiAlON, α-silicon nitride, β-SiAlON, and β-silicon nitride. Accordingly, the wear resistance can be improved when used as a cutting tool.

Furthermore, both or one of the SiAlON and the silicon nitride more preferably have/has at least one of an α-crystal structure and a β-crystal structure in addition to the cubic crystal structure, and a peak intensity ratio Rc is not less than 20%. Peak intensity ratio Rc represents a ratio of an intensity of a main peak of an X-ray diffraction of the cubic crystal structure to a total of intensities of main peaks of X-ray diffractions of the α-crystal structure, the β-crystal structure, and the cubic crystal structure. This is because a balance between the hardness and the toughness accordingly becomes excellent, thus achieving both high wear resistance and high chipping resistance.

Peak intensity ratio Rc can be calculated as follows. Specifically, in the case of the SiAlON, the sintered material is surface-ground using a diamond grindstone No. 400 and measurement is performed with respect to this ground surface using Cu-Kα characteristic X ray, thereby obtaining an X-ray diffraction pattern. Next, based on this X-ray diffraction pattern, the following peak intensities are calculated: a peak intensity Ic (311) for a (311) plane, which is a main peak of the cubic SiAlON; a peak intensity Iα (201) for a (201) plane, which is a main peak of the α-SiAlON; and a peak intensity Iβ (200) for a (200) plane, which is a main peak of the β-SiAlON. Further, Rc can be calculated by substituting the values of these peak intensities into a below-described formula (1).

In the case of the silicon nitride, an X-ray diffraction pattern is first obtained in the same manner as in the case of the SiAlON. Next, based on this X-ray diffraction pattern, the following peak intensities are calculated: a peak intensity Ic (311) for a (311) plane, which is a main peak of the cubic silicon nitride; a peak intensity Iα (201) for a (201) plane, which is a main peak of the α-silicon nitride; and a peak intensity Iβ (200) for a (200) plane, which is a main peak of the β-silicon nitride. Further, Rc can be calculated by substituting the values of these peak intensities into the below-described formula (1). Furthermore, even in the case where both the silicon nitride and the SiAlON exist, the respective positions of the peak intensities of α phase, β phase, and c phase (cubic) thereof closely overlap. Hence, Rc can be defined to one value.

[Formula 1]

$$Rc = \frac{Ic(311)}{Ic(311) + I\alpha(201) + I\beta(200)} \times 100 \quad (1)$$

In the sintered material according to the present embodiment, when peak intensity ratio Rc is less than 20%, the hardness is decreased, thus resulting in insufficient wear resistance when used as a cutting tool. It should be noted that the upper limit value of peak intensity ratio Rc is theoretically 100%.

Further, when the SiAlON or the silicon nitride is included as the second material of the sintered material according to the present embodiment, this SiAlON is preferably one (hereinafter, also referred to as "M-SiAlON" or "M-silicon nitride") expressed as $M_xSi_{6-x-z}Al_zO_zN_{8-z}$. The M is at least one metal selected from a group consisting of calcium, strontium, barium, scandium, yttrium, lanthanoid, manganese, iron, cobalt, nickel, and copper, a group 4 element (Ti, Zr, Hf, or the like), a group 5 element (V, Nb, Ta, or the like), and a group 6 element (Cr, Mo, W, or the like) in a periodic table. When a predetermined ratio of the M, which is a metal, is dissolved in the SiAlON in a solid state to construct the M-SiAlON, the chipping resistance can be improved. This is because the M, which is a metal having an atomic radius different from those of silicon and aluminum, is dissolved in a solid state in the crystal structure of the SiAlON, thereby generating a strain in the crystal lattice to attain strengthening of the crystal. For the M, a plurality of different types of metals can be added.

The atomic ratio of each of the elements of the $M_xSi_{6-x-z}Al_zO_zN_{8-z}$ preferably satisfies $0.01 \leq x \leq 2$, $0 \leq z \leq 4.2$, and $1.79 \leq 6-x-z \leq 5.99$. When x is less than 0.01, the amount of solid solution of the M in the SiAlON becomes insufficient, thus resulting in insufficient strength. On the other hand, when x is more than 2, the M included in the SiAlON becomes excessive, thus resulting in decreased strength.

When z is more than 4.2, alumina is precipitated to result in brittleness. A preferable range of x is 0.01 to 0.5, and a preferable range of z is 0 to 2.

<Third Phase>

The sintered material according to the present embodiment preferably further includes a third phase. The third phase is preferably at least one compound composed of: at least one element selected from a group consisting of a group 4 element, a group 5 element, a group 6 element in the periodic table, boron, and Al; and at least one element selected from a group consisting of carbon, nitrogen, oxygen, and boron, or the third phase is preferably a solid solution of the compound. The sintered material including such a third phase has improved sinterability and more improved strength.

It should be noted that such a compound or solid solution of the third phase is not composed only of boron.

Specific examples of the above-described compound include cBN, TiC, TiN, $TiB_2$, TiCrN, ZrC, ZrN, $ZrB_2$, AlCrN, AlN, $AlB_2$, HOC, HfN, VC, VN, NbC, TaC, CrC, CrN, $Cr_2N$, MoC, WC, and the like. The third phase can be composed of one of these compounds or can be composed of a combination of two or more of the compounds. Furthermore, the third phase may be a solid solution composed of a combination of two or more of the above-described compounds.

Preferably, such a third phase has an average grain size of 0.05 to 5 µm. If the average grain size is less than 0.05 µm, the third phase is likely to be aggregated when mixed with other powders such as the first material, thus resulting in a tendency of insufficient sintering. If the average grain size is more than 5 µm, the strength tends to be decreased due to grain growth during sintering. The average grain size of the third phase is more preferably 0.05 to 2 µm. In the present specification, the average value of the equivalent circle diameters of the third phase is regarded as the average grain size of the third phase.

5 to 50 volume % of the third phase is preferably included in the sintered material. When less than 5 volume % of the third phase is included, the strength of the sintered material may not be sufficiently improved. On the other hand, when more than 50 volume % of the third phase is included, the ratio of the first material is decreased to presumably result in decreased hardness of the sintered material. A more preferable ratio of the third phase is 10 to 30 volume %.

The average grain size of the third phase can be found as follows. Specifically, the sintered material is subjected to a CP process using an ion beam, thereby forming a smooth cross section. Next, the cross section is observed by an SEM to obtain 10 microscope images. Further, from each microscope image, 20 equivalent circle diameters of the third phase are calculated by a binarization process employing image analysis software (therefore, a total of 200 equivalent circle diameters of the third phase are calculated, i.e., 10 microscope images×20 equivalent circle diameters of the third phase).

Further, the ratio of the third phase in the sintered material can be calculated by: checking a region of the third phase based on a reflection electron image obtained by measuring a CP-processed surface using an SEM or based on element analysis employing the Auger electron spectroscopy; and then measuring an area of the region by a binarization process employing image analysis software.

<Production Method>

The sintered material according to the present embodiment can be produced using a conventionally known production method except that the first material is obtained by the above-described method, and the method of producing the sintered material is not limited in particular.

For example, as a source material, the first material, the second material, and the other components (for example, particles constituting the third phase) are mixed using a bead mill, a ball mill, or the like. Next, sintering is performed for 10 to 60 minutes at a temperature of 1300 to 1700° C. and a pressure of 10 MPa to 7 GPa, thereby obtaining the sintered material. Particularly, in order to precipitate fine $Al_2O_3$ in the first material, it is preferable to perform ultra-high pressure sintering at a pressure of 4 to 7 GPa.

<Cutting Tool>

As described above, the sintered material according to the present embodiment exhibits characteristics such as excellent chipping resistance and excellent wear resistance. Hence, the sintered material can be used for a cutting tool or the like. That is, a cutting tool according to the present embodiment includes the above-described sintered material.

Here, examples of the cutting tool include a drill, an end mill, an indexable cutting insert for drill, an indexable cutting insert for end mill, an indexable cutting insert for milling, an indexable cutting insert for turning, a metal saw, a gear cutting tool, a reamer, a tap, a cutting bite, and the like.

The above cutting tool may be entirely constituted of the sintered material of the present embodiment, or may be partially (for example, edge portion) constituted of the sintered material of the present embodiment. Moreover, a coating film may be formed on a surface of such a cutting tool.

EXAMPLES

While the present invention will be described in more detail with reference to Examples, the present invention is not limited thereto.

Example 1

As the source material, 90 volume % of the β-SiAlON (second material) and 10 volume % of the first material were prepared. Specifically, β-SiAlON particle powder (trademark: "Z-2" provided by Zibo Hengshi Technology Development Co., Ltd; average particle size of 2 µm) was used as the β-SiAlON, and the first material produced by the neutralization co-precipitation method in a below-described manner was used. The first material was partially stabilized $ZrO_2$ in which 15 volume % of $Al_2O_3$ was dissolved in a solid state with respect to the whole of the first material. The grain size of the first material was 0.15 µm.

(Production of First Material (Precursor))

As described above, the first material can be produced by the following method based on the paper (J. Jpn. Soc. Powder Powder Metallurgy, Vol. 60, No. 10, P428-435) published in 2013.

Specifically, a mixed aqueous solution is prepared by first adding zirconium oxychloride ($ZrOCl_2.8H_2O$), aluminum chloride ($AlCl_3$), and yttrium chloride ($YCl_3$) to water such that a molar ratio of $ZrO_2$ and $Y_2O_3$ becomes "$ZrO_2$:$Y_2O_3$=98.5:1.5" and such that a molar ratio of $ZrO_2$ including $Y_2O_3$ and $Al_2O_3$ becomes "($ZrO_2$ including $Y_2O_3$):$Al_2O_3$=75:25".

An aqueous ammonia solution is added to this mixed aqueous solution to co-precipitate Zr, Y, and Al through simultaneous neutralization, and a resulting precipitate is filtered, is washed by water, and is dried, thereby preparing amorphous hydrated zirconia (75 mol % (98.5 mol % of ZrO$_2$-1.5 mol % of Y$_2$O$_3$)-25 mol % of Al$_2$O$_3$) solid solution powder.

Then, the obtained solid solution powder is calcinated (thermally treated) at 700° C. in air for 9 hours, and is further calcinated at 900° C. for 1 hour, thereby obtaining crystalline ZrO$_2$ (having Al$_2$O$_3$ and Y$_2$O$_3$ dissolved therein in a solid state) powder, which is the first material (precursor). This first material (precursor) is partially stabilized ZrO$_2$ in which 15 volume % of Al$_2$O$_3$ is dissolved in a solid state with respect to the whole of the first material.

Then, the β-SiAlON and the first material (precursor) prepared above are mixed using a ball mill to obtain a mixture.

Then, the mixture is equally divided into six pieces, and five of the six pieces are sintered by maintaining them for 15 minutes at pressures and sintering temperatures shown in Table 1 below, thereby obtaining five sintered materials No. 1A to No. 1E. It should be noted that the remaining one of the six pieces equally divided from the mixture is used as a sintered material No. 1L described later.

Each of sintered materials No. 1A to No. 1E obtained by the above-described method was subjected to a CP process as described above, and a cross section thereof is observed by an SEM. Accordingly, the locations of existence of Al$_2$O$_3$ in the first material were specified. Moreover, the equivalent circle diameter (grain size) and content (volume %) of Al$_2$O$_3$ were calculated by a binarization process employing image analysis software (trademark: "WinROOF ver.6.5.3" provided by Mitani Corporation). As a result, it was confirmed that the grain size was as shown in Table 1 and the content was the same as that of the source material (15 volume %; the locations of existence were in crystal grain boundaries or crystal grains). Simultaneously, the average grain size of the β-SiAlON and the average grain size of the first material were identified. As a result, the average grain size of the β-SiAlON was the same as the average grain size of the source material; however, the average grain size of the first material was 2 μm.

Further, in each of the CP-processed surfaces of sintered materials No. 1A to No. 1E, regions of the β-SiAlON and first material were identified based on a reflection electron image measured by an SEM. Then, respective areas of the regions were measured through a binarization process employing the above-described image analysis software. As a result, it was confirmed that each of the sintered materials included the first material and the β-SiAlON and the ratio of the first material and the β-SiAlON was the same as the ratio in the source material (i.e., 90 volume % of the β-SiAlON and 10 volume % of the first material).

As comparative examples, sintered materials No. 1F and No. 1G were produced. First, sintered material No. 1F was produced as follows. Specifically, the following powders were prepared: 90 volume % of the β-SiAlON (β-SiAlON particle powder described above); 8.5 volume % of partially stabilized ZrO$_2$ powder (trademark: "TZ-3Y" provided by TOSOH; average particle size of 0.05 μm); and 1.5 volume % of Al$_2$O$_3$. Each powder of ZrO$_2$ and Al$_2$O$_3$ is to replace the first material, and this partially stabilized ZrO$_2$ powder does not include Al$_2$O$_3$ in its crystal grain boundaries or crystal grains (for convenience, in Table 1, the average particle size of the Al$_2$O$_3$ powder is described in the column of the average grain size of the Al$_2$O$_3$ in the first material).

Next, these powders were mixed in the same manner as described above to obtain a mixture, and this mixture was maintained for 15 minutes at pressure and sintering temperature shown in Table 1, thereby obtaining a sintered material No. 1F.

Further, only the β-SiAlON (β-SiAlON particle powder) powder was used without adding the first material, and was sintered by maintaining it for 15 minutes at pressure and sintering temperature shown in Table 1, thereby obtaining a sintered material No. 1G.

Next, each of sintered materials No. 1A to No. 1G was used to produce a cutting tool having a shape with DNGA150412, a negative land angle of 20° and a negative land width of 0.06 mm. Then, a test of cutting a heat-resistant alloy was performed. Specifically, an external cylindrical turning test was performed under below-described conditions to find a cutting distance until one of the wear amount of the tool edge and the size of chipping of the flank face of the tool edge reached 0.2 mm. Such a cutting distance (km) was regarded as the tool life. The results are shown in Table 1 below. It should be noted that the tables below also illustrate whether the tool life was reached because the wear amount reached 0.2 mm (described as "wear") or the tool life was reached because the size of chipping reached 0.2 mm (described as "chipping").

(Cutting Condition)
Cutting speed: 200 m/min
Feed rate: 0.2 mm/rev.
Depth of cut: 0.3 mm
Coolant: Wet (emulsion)
Coolant supply pressure: 0.15 MPa
Lathe: LB 4000 (provided by OKUMA Corporation)
Workpiece: Inconel® 718 (provided by Daido Special Metals Corporation; solution-treated and age-hardened material with a Rockwell hardness HRC (a diamond cone with a tip radius of 0.2 mm and a tip angle of 120° was used to apply a load of 150 kgf) corresponding to 44 and with a grain size represented by a grain size number of 9 defined by ASTM (American Society for Testing and Materials) E112)

Shape of workpiece: cylindrical shape (outer diameter φ of 95 mm).

TABLE 1

| Sintered Material No. | Sintering Pressure | Sintering Temperature (° C.) | Grain Size of Al$_2$O$_3$ in First Material (μm) | Cutting Distance (km) | Cause of Reached Life |
|---|---|---|---|---|---|
| 1A | 5 (GPa) | 1350 | 0.03 | 2.0 | Wear |
| 1B | 5 (GPa) | 1400 | 0.06 | 1.8 | Chipping |
| 1C | 5 (GPa) | 1500 | 0.1 | 1.6 | Chipping |
| 1D | 5 (GPa) | 1600 | 0.5 | 1.1 | Chipping |
| 1E | 5 (GPa) | 1700 | 1 | 0.7 | Chipping |
| 1F | 5 (GPa) | 1400 | 1.6 | 0.4 | Chipping |
| 1G | 5 (GPa) | 1400 | — | 0.2 | Chipping |
| 1H | 5 (GPa) | 1300 | 0.3 | 0.2 | Wear |
| 1I | 5 (GPa) | 1350 | 0.5 | 0.2 | Wear |
| 1J | 5 (GPa) | 1400 | 0.7 | 0.2 | Wear |
| 1K | 5 (GPa) | 1500 | 1 | 0.1 | Wear |
| 1L | 30 (MPa) | 1500 | 1 | 0.7 | Chipping |
| 1M | 2.5 (GPa) | 1500 | 0.6 | 0.9 | Chipping |

From Table 1, it is understood that each of the cutting tools produced using sintered materials No. 1A to No. 1E of the Examples in each of which the average grain size of the Al$_2$O$_3$ was not more than 1.0 μm had a longer life until it was "chipped" as compared with each of the cutting tools produced using sintered material No. 1F and sintered material No. 1G of the Comparative Examples, and therefore each of the cutting tools produced using sintered materials No. 1A to No. 1E was excellent in chipping resistance in processing a difficult-to-cut material. In view of comparison among the cutting tools of sintered materials No. 1A to No. 1E, the average grain size of the $Al_2O_3$ was smaller, the life was longer until it was "chipped, and the chipping resistance was more excellent as the sintering temperature became lower. Specifically, it was understood that the chipping resistance was confirmed to be improved in each of the cutting tools of sintered materials No. 1A to No. 1D in each of which the average grain size of the $Al_2O_3$ was not more than 0.5 µm, particularly, the life is significantly improved in each of the cutting tools of sintered materials No. 1A to No. 1C in each of which the average grain size of the $Al_2O_3$ is not more than 0.1 µm. It should be noted that in Example 1 and subsequent Examples, a cutting tool having a tool life with a cutting distance of more than 0.5 km was evaluated as a good product, and a cutting tool having a tool life with a cutting distance of not less than 1.0 km was determined as a very good product having very excellent chipping resistance.

<Reference Experiment>

(Influence of Second Material)

Only the first material (precursor) prepared above was used and sintering was performed by maintaining it for 15 minutes at pressure and sintering temperature shown in Table 1, thereby obtaining four sintered materials No. 1H to No. 1K. Each of the cutting tools produced using these sintered materials was subjected to the same cutting test as described above. Further, for each of sintered materials No. 1H to No. 1K, the grain size of the $Al_2O_3$ was measured in the same manner as described above. These results are shown in Table 1 above.

As apparent from Table 1, it was indicated that in each of sintered materials No. 1H to No. 1K, the grain size of the $Al_2O_3$ tended to be smaller as the sintering temperature becomes lower; however, the grain size of the $Al_2O_3$ in each of sintered materials No. 1H to No. 1K was about 5 to 10 times as large as the grain size of the $Al_2O_3$ in each of all the sintered materials No. 1A to No. 1E (i.e., sintered materials obtained by mixing and sintering the first material and the β-SiAlON). The life of each of the cutting tools of sintered materials No. 1H to No. 1K was reached due to "wear" at a time earlier than the life of each of the cutting tools of sintered materials No. 1A to No. 1E. In this way, it was confirmed that when the first material and the β-SiAlON are mixed and sintered, the very small grain size of the $Al_2O_3$ was generated, thereby increasing the toughness.

(Influence of Pressure During Sintering)

For comparison among sintering methods, a mixture, which had not been sintered yet and was the same as the mixture used for each of sintered materials No. 1A to No. 1E, was sintered by maintaining it for 15 minutes at a pressure of 30 MPa and a temperature of 1500° C. or at a pressure of 2.5 GPa and a temperature of 1500° C., thereby obtaining sintered materials No. 1L and No. 1M. Each of the cutting tools produced using sintered materials No. 1L and No. 1M was subjected to the cutting test in the above-described manner. Also, for each of sintered materials No. 1L and No. 1M, the grain size of the $Al_2O_3$ was measured in the same manner as described above. These results are shown in Table 1 above.

Since each of sintered materials No. 1L and No. 1M was sintered at the same temperature as the temperature for sintered material No. 1C but under a lower pressure, respective grains of $Al_2O_3$ of sintered material No. 1L and No. 1M were grown to grain sizes of 1 µm and 0.6 µm. Further, the life of each of the cutting tools of sintered materials No. 1L and No. 1M was reached due to chipping at a time earlier than the cutting tool of sintered material No. 1C, which was a very good product. As described above, it was indicated that not only the sintering temperature but also the pressure are important in order to generate sufficiently fine $Al_2O_3$ in the first material.

Example 2

Six sintered materials (sintered materials No. 2A, No. 2B, No. 2C, No. 2D, No. 2E, No. 2F) were produced by calcinating under the same conditions as those for sintered material No. 1C (i.e., with a sintering temperature of 1500° C.) of Example 1 except that the content of the first material in the sintered material was changed as shown in a below-described Table 2.

From these six sintered materials, cutting tools each having the same shape as that in Example 1 were produced. By using each of the cutting tools, the same cutting test as that in Example 1 was performed. The results are shown in Table 2 below. Further, for each of these six sintered materials, the locations of existence of the $Al_2O_3$ in the first material were specified and the equivalent circle diameter (grain size) and content of the $Al_2O_3$ were calculated in the same manner as in Example 1. As a result, it was confirmed that they were the same as those of sintered material No. 1C of Example 1 (the grain size was 0.1 µm; the content was 15 volume %; and the locations of existence were in the crystal grain boundaries or the crystal grains). Simultaneously, the average grain size of the β-SiAlON and the average grain size of the first material were identified. As a result, it was confirmed that the average grain size of the β-SiAlON was the same as the average grain size of the source material but the average grain size of the first material was 2 µm. It was also confirmed that the ratio of the first material and the β-SiAlON was the same as the ratio in the source material (the amount of the first material is the volume % shown in Table 2 and the remainder was the β-SiAlON).

TABLE 2

| Sintered Material No. | Content of First Material (volume %) | Cutting Distance (km) | Cause of Reached Life |
| --- | --- | --- | --- |
| 2A | 0.5 | 0.2 | Chipping |
| 2B | 1 | 0.6 | Chipping |
| 2C | 2 | 1.0 | Chipping |
| 1C | 10 | 1.6 | Chipping |
| 2D | 20 | 1.0 | Wear |
| 2E | 50 | 0.5 | Wear |
| 2F | 55 | 0.3 | Wear |

From Table 2, it is understood that the cutting tool of sintered material No. 2A including a very small amount of the first material was chipped at an early time because the mechanism of providing toughness by the first material does not sufficiently work. The cutting tool of sintered material No. 2F including a very large amount of the first material was worn rapidly. As apparent from Table 2, it was confirmed that the cutting tool produced from the sintered material including 1 to 50 volume % of the first material had excellent toughness, excellent wear resistance, and excellent chipping resistance in processing a difficult-to-cut material. Particularly, the cutting tool produced from the sintered material including 2 to 20 volume % of the first material had more excellent chipping resistance.

Example 3

Five sintered materials were produced in the same manner as the production of sintered material No. 1C of Example 1 except that the first material (content: 10 volume %) in each of the sintered materials was replaced with one of the following first material (1) to first material (5).

[First Material (1)]

The sintered material represented by the first material (1) is produced by the neutralization co-precipitation method described in Example 1, the first material (1) is partially stabilized $ZrO_2$ in which 5 volume % of $Al_2O_3$ is dissolved in a solid state, and the average grain size of this partially stabilized $ZrO_2$ is 0.15 μm.

[First Material (2)]

The sintered material represented by the first material (2) is produced by the neutralization co-precipitation method described in Example 1, the first material (2) is partially stabilized $ZrO_2$ in which 30 volume % of $Al_2O_3$ is dissolved in a solid state, and the average grain size of this partially stabilized $ZrO_2$ is 0.15 μm.

[First Material (3)]

The sintered material represented by the first material (3) is produced by the neutralization co-precipitation method described in Example 1, the first material (3) is partially stabilized $ZrO_2$ in which 50 volume % of $Al_2O_3$ is dissolved in a solid state, and the average grain size of this partially stabilized $ZrO_2$ is 0.15 μm.

[First Material (4)]

The sintered material represented by the first material (4) is produced by the neutralization co-precipitation method described in Example 1, the first material (4) is partially stabilized $ZrO_2$ in which 90 volume % of $Al_2O_3$ is dissolved in a solid state, and the average grain size of this partially stabilized $ZrO_2$ is 0.15 μm.

[First Material (5)]

The sintered material represented by the first material (5) is produced by the neutralization co-precipitation method described in Example 1, the first material (5) is partially stabilized $ZrO_2$ in which 95 volume % of $Al_2O_3$ is dissolved in a solid state, and the average grain size of this partially stabilized $ZrO_2$ is 0.15 μm.

As a comparative example, a sintered material was produced using only the above-described partially stabilized $ZrO_2$ powder (trademark: "TZ-3Y" provided by TOSOH; average grain size of 0.05 μm).

From these five sintered materials and the sintered material of the comparative example, cutting tools each having the same shape as that in Example 1 were produced. By using each of the cutting tools, the same cutting test as that in Example 1 was performed. The results are shown in Table 3 below.

Here, for each of these five sintered materials, the same method as that of Example 1 was employed to specify the locations of existence of $Al_2O_3$ in the first material and calculate the equivalent circle diameter (grain size) and content of $Al_2O_3$. As a result, it was confirmed that the grain size of the first material in each of the sintered materials was 2 μm, the grain size of $Al_2O_3$ in each of the sintered materials was 0.1 μm, the locations of existence of $Al_2O_3$ were located in the crystal grain boundaries or the crystal grains, and the content ratio of $ZrO_2$ and $Al_2O_3$ in each of the sintered materials was substantially the same as the content ratio of them when blending for the source material.

Further, based on a reflection electron image obtained by measuring a CP-processed surface of each of the sintered materials using an SEM, regions of the β-SiAlON, the $ZrO_2$ and the $Al_2O_3$ were identified and areas of the regions were measured by a binarization process employing the above-described image analysis software. As a result, it was confirmed that the composition and content of each of the β-SiAlON, the $ZrO_2$, and the $Al_2O_3$ were substantially the same as those when blending for the source material.

TABLE 3

| Type of First Material | Amount of $Al_2O_3$ in First Material (Volume %) | Cutting Distance (km) | Cause of Reached Life |
|---|---|---|---|
| First Material (1) | 5 | 0.7 | Wear |
| First Material (2) | 30 | 1.2 | Chipping |
| First Material (3) | 50 | 0.7 | Chipping |
| First Material (4) | 90 | 0.6 | Chipping |
| First Material (5) | 95 | 0.2 | Chipping |
| Only $ZrO_2$ | 0 | 0.3 | Wear |

From Table 3, it is understood that the cutting tool produced from the sintered material including the first material (5) having an excess of $Al_2O_3$ was chipped at an early time because the mechanism of providing toughness by the first material did not sufficiently work. The cutting tool produced from the sintered material (comparative example) in which the first material was composed only of $ZrO_2$ and did not include $Al_2O_3$ was not provided with toughness and was worn out at an early time, thus resulting in a short life. As apparent from Table 3, the cutting tool produced from the sintered material including 5 to 90 volume % of $Al_2O_3$ with respect to the whole of the first material has excellent toughness and excellent wear resistance, and has excellent chipping resistance in processing a difficult-to-cut material.

Example 4

In Example 4, the first material (partially stabilized $ZrO_2$ in which 15 volume % of $Al_2O_3$ was dissolved in a sold state; grain size of 0.15 μm) used for Example 1 as the source material was used. Further, as the second material, there was/were employed at least one or two or more selected from a group consisting of: α-silicon nitride particle powder (trademark: "SN E-10" provided by Ube Industries, Ltd; average particle size of 0.5 μm); β-silicon nitride particle powder (trademark: "SN-F1" provided by Denka; average particle size of 2 μm); α-SiAlON particle powder (trademark: "ALONBRIGHT YL-C" provided by Denka); β-SiAlON particle powder (average particle size of 2 μm); TiN powder (trademark: "TiN-01" provided by Japan New Materials Co., Ltd; average particle size of 1 μm); cubic silicon nitride (c-$Si_3N_4$) synthesized by a below-described method; and cubic SiAlON (c-SiAlON) synthesized by a below-described method.

(Synthesis of Cubic Silicon Nitride and Cubic SiAlON)

In order to produce the cubic silicon nitride, 500 g of the above-described β-silicon nitride was first mixed with 9500 g of copper powder serving as a heat sink. A resulting mixture was introduced in a steel tube. Then, an amount of explosive set to provide a temperature of 1900° C. and an impact pressure of 40 GPa was used to provide impact compression to the steel tube having the mixture introduced therein, thereby synthesizing the cubic silicon nitride. After the impact compression, the mixed powder was taken out from the steel tube and the copper powder was removed by acid cleaning, thereby obtaining synthetic powder of the cubic silicon nitride.

On the other hand, in order to produce the cubic SiAlON, 500 g of the above-described β-SiAlON particle powder was mixed with 9500 g of copper powder serving as a heat sink. A resulting mixture was introduced into the steel tube. Then, an amount of explosive set to provide a temperature of 1900° C. and an impact pressure of 40 GPa was used to provide impact compression to the steel tube having the mixture introduced therein, thereby synthesizing the cubic SiAlON. After the impact compression, the mixed powder was taken out from the steel tube and the copper powder was removed by acid cleaning, thereby obtaining synthetic powder of the cubic SiAlON.

Each of these synthetic powders was analyzed under below-described conditions using an X-ray diffractometer (trademark: "X'Pert Powder" provided by PANalytical), thereby identifying cubic silicon nitride (JCPDS card: 01-074-3494) and β-silicon nitride (JCPDS card: 01-077-0755) or cubic SiAlON (JCPDS card: 01-074-3494) and β-SiAlON (JCPDS card: 01-077-0755). JCPDS is an abbreviation of Joint Committee on Powder Diffraction Standards.

Characteristic X ray: Cu-Kα
    Tube voltage: 45 kV
    Tube current: 40 A
    Filter: Multilayer mirror
    Optical system: Parallel beam method
    X-ray diffraction method: θ-2θ method
    Test range: 2θ=10 to 80°
    Scanning step: 0.03°
    Scanning speed: 1 step/second Further, from the X-ray diffraction pattern of each of the synthetic powders, peak intensity ratio Rc was calculated. Specifically, the following peak intensities were calculated: a peak intensity Ic (311) for a (311) plane, which is a main peak of the cubic silicon nitride; and a peak intensity Iβ (200) for a (200) plane, which is a main peak of the β-silicon nitride. Further, the following peak intensities were calculated: a peak intensity Ic (311) for a (311) plane, which is a main peak of the cubic SiAlON; and a peak intensity Iβ (200) for a (200) plane, which is a main peak of the β-SiAlON. These were substituted into the formula (1) above, and it was found that peak intensity ratio Rc in the silicon nitride was 95% and peak intensity ratio Rc in the SiAlON was 90%. Therefore, it was determined that each of the cubic silicon nitride and the cubic SiAlON could be synthesized.

In Example 4, 14 sintered materials No. 4A to No. 4N were produced in the same manner as sintered material No. 1C of Example 1 (i.e., with a sintering temperature of 1500° C.) except that the contents (volume %) of the first and second materials in the sintered material were changed as shown in Table 4 below. Next, an X-ray diffraction pattern of each sintered material was obtained under the above-described conditions using the above-described X-ray diffractometer. Based on this, peak intensity ratio Rc in each of sintered materials No. 4A to No. 4N was calculated from the formula (1) above and was shown in Table 4.

Further, from sintered materials No. 4A to No. 4N, cutting tools each having the same shape as that in Example 1 were produced. By using each of the cutting tools, the same cutting test as that in Example 1 was performed. The results are shown in Table 4 below.

Here, for each of sintered materials No. 4A to No. 4N, the same method as that in Example 1 was employed to specify the locations of existence of the $Al_2O_3$ in the first material and calculate the equivalent circle diameter (grain size) and content (volume %) of the $Al_2O_3$. As a result, it was confirmed that the grain size of the first material was about 2 μm, the grain size of the $Al_2O_3$ was 0.1 μm, the locations of existence of the $Al_2O_3$ were in the crystal grain boundaries or the crystal grains, and the content ratio of the $ZrO_2$ and the $Al_2O_3$ in the sintered material was substantially the same as that when blending for the source material.

Further, based on a reflection electron image obtained by measuring a CP-processed surface of each sintered material using an SEM, regions of the TiN, the silicon nitride, the SiAlON, the $ZrO_2$ and the $Al_2O_3$ were identified and areas of the regions were measured by a binarization process employing the above-described image analysis software. As a result, it was confirmed that the composition and content of each of the TiN, the total of the silicon nitride, the total of the SiAlON, the $ZrO_2$ and the $Al_2O_3$ were substantially the same as those when blending for the source material.

TABLE 4

| Sintered Material No. | First Material $ZrO_2$—$Al_2O_3$ | Second Material | | | | | | | Rc (%) | Cutting Distance (km) | Cause of Reached Life |
|---|---|---|---|---|---|---|---|---|---|---|---|
| | | α-$Si_3N_4$ | β-$Si_3N_4$ | c-$Si_3N_4$ | α-SiAlON | β-SiAlON | c-SiAlON | TiN | | | |
| 4A | 5 | 95 | — | — | — | — | — | — | 0 | 1.3 | Chipping |
| 4B | 20 | 80 | — | — | — | — | — | — | 0 | 1.1 | Wear |
| 4C | 20 | 55 | 25 | — | — | — | — | — | 0 | 1.0 | Wear |
| 4D | 20 | — | 25 | 55 | — | — | — | — | 70 | 2.5 | Wear |
| 4E | 20 | — | — | — | — | 80 | — | — | 0 | 1.1 | Wear |
| 4F | 20 | — | — | — | — | 65 | 15 | — | 19 | 1.5 | Wear |
| 4G | 20 | — | — | — | — | 60 | 20 | — | 23 | 2.0 | Wear |
| 4H | 20 | — | — | — | — | 20 | 60 | — | 78 | 2.8 | Wear |
| 4I | 20 | — | — | — | — | 40 | — | 40 | 0 | 1.3 | Wear |
| 4J | 20 | — | — | — | — | 25 | 25 | 30 | 51 | 3.0 | Wear |
| 4K | 20 | — | — | — | — | — | — | 80 | 0 | 1.0 | Chipping |
| 4L | 20 | — | — | — | 80 | — | — | — | 0 | 1.0 | Wear |
| 4M | 20 | — | 60 | — | — | — | — | 20 | 0 | 1.2 | Wear |
| 4N | 20 | — | 30 | — | — | 30 | — | 20 | 0 | 1.3 | Wear |

From Table 4, each of the cutting tools produced from sintered materials No. 4D, No. 4F to No. 4H and No. 4J including the cubic silicon nitride or the cubic SiAlON as the second material achieved an extended cutting distance and had an improved life as compared with the cutting tool produced from each of sintered materials No. 4A to No. 4C, No. 4E, No. 4I, and No. 4L to No. 4N each not including them and each composed of silicon nitride or SiAlON as well as the cutting tool produced from sintered material No. 4K composed of TiN. This is presumably because the wear resistance was improved due to the inclusion of the cubic crystal structure. Particularly, when Rc was not less than 20% (sintered materials No. 4D, No. 4G, No. 4H, No. 4J), the life was improved significantly. It was confirmed that the cutting tool of sintered material No. 4J in which the TiN, the β-SiAlON, and the cubic SiAlON were combined had a remarkably improved life, had very excellent toughness, and had very excellent chipping resistance in processing a difficult-to-cut material.

Example 5

First, there were prepared: $CeO_2$ powder (trademark: "fine particle type: C grade" provided by Shin-Etsu Chemical Co., Ltd; average particle size of 0.6 μm); Si powder (trademark: "SIE 19PB" provided by Kojundo Chemical Laboratory; particle size of not more than 45 μm); Al powder (trademark: "300A" provided by Minalco Ltd; particle size of not more than 45 μm); and $SiO_2$ powder (trademark: "FB-5D" provided by Denka; average particle size of 5 μm). In the present example, in order to synthesize M-SiAlON (M=Ce) powder, these powders are selected appropriately and blended to attain Ce—SiAlON represented by $Ce_xSi_{6-x-z}Al_zO_zN_{8-z}$, where x is 0 to 2.2 and z is 2. They were employed as starting materials of sintered materials No. 5A to No. 5E. Table 5 shows a value of atomic ratio x of Ce—SiAlON converted from each of the starting materials of sintered materials No. 5A to No. 5E.

In order to produce each of sintered materials No. 5A to No. 5E, 200 g of NaCl powder (trademark: "sodium chloride (I)" provided by Kojundo Chemical Laboratory) for reaction dilution and temperature adjustment was added to 200 g of each of the starting materials, and then was introduced into a polyethylene container (trademark: "Wide mouthed bottle 500 ml" provided by As One Corporation) having 500 g of a silicon nitride ball with ϕ of 6 mm. Then, a shaker/mixer (trademark: "T2C type" provided by Shinmaru Enterprises Corporation) was employed to perform dry mixing for 30 minutes to obtain mixed powder. From this mixed powder, the β-Ce—SiAlON was produced through a high-temperature nitriding synthetic method using a combustion synthesis device.

Specifically, the mixed powder was placed in a porous carbon crucible (custom-made product provided by Tokai Carbon Co., Ltd.) having a capacity of 500 mL, and then a pellet of Ti powder (trademark: "TC 450" provided by Toho Titanium; particle size of not more than 45 μm) molded into a shape with a diameter of 20 mm and a thickness of 5 mm was set on the mixed powder as an igniting material. The above-described crucible was placed on a stage in the combustion synthesis device, and a tungsten wire (provided by Allied-Material; wire size ϕ of 0.5 mm) serving as an ignition source was then attached between electrodes. The combustion synthesis device was vacuumed using a rotary pump, and then a high-purity nitrogen gas (having a purity of not less than 99.99 volume %) of JIS 2 grade was introduced to increase a nitrogen gas pressure to 3 MPa in the device.

In order to start a synthetic reaction, voltage between the electrodes was increased to cause the tungsten wire to be white-hot, thereby igniting the pellet. Resulting reaction heat was propagated to the mixed powder to induce self-combustion reaction of β-Ce—SiAlON. On this occasion, the reaction temperature was measured using a two-color radiation thermometer (trademark: "ISQ-5" provided by Hazama Sokki Ltd.) and was 2500° C.

Then, the reaction product was taken out from the device and the aggregation thereof was pulverized using an alumina mortar. Further, NaCl was removed from the reaction product in pure water.

The reaction product after the removal of NaCl was analyzed under below-described conditions using an X-ray diffractometer (trademark: "MiniFlex600" provided by Rigaku), and all the X-ray diffraction peaks coincided with those of $β-Ce_xSi_{4-x}Al_2O_2N_6$ (JCPDS card: 01-077-0755). Hence, it was determined that the β-Ce—SiAlON in which z was 2 could be synthesized.

Characteristic X ray: Cu-Kα
Tube voltage: 45 kV
Tube current: 15 mA
Filter: Multilayer mirror
Optical system: Parallel beam method
X-ray diffraction method: θ-2θ method
Measurement range: 2θ=20 to 100°
Scanning step: 0.02°
Scanning speed: 1 step/second.

Next, in order to obtain a source material for impact synthesis of cubic Ce—SiAlON, the reaction product obtained by the high-temperature nitriding synthetic method, i.e., the β-Ce—SiAlON powder corresponding to each of sintered materials No. 5A to No. 5E was roughly pulverized using an alumina mortar until it became not more than 150 μm. Then, the reaction product was ground using a ball mill. Specifically, 200 g of the β-Ce—SiAlON powder, 600 mL of ethanol, and 2 kg of a silicon nitride balls each with ϕ of 5 mm were introduced into a polystyrene pot having a capacity of 2L. Each of the β-Ce—SiAlON powders corresponding to sintered materials No. 5A to No. 5E was subjected to wet ball mill for 5 hours, thereby obtaining dispersion slurry. This dispersion slurry was dried naturally, and then the dried powder was caused to pass through a sieve with an opening of 45 μm, thus obtaining a source material for impact synthesis of the cubic Ce—SiAlON.

Next, 500 g of the above-described source material (β-Ce—SiAlON powder having passed through the sieve) was mixed with 9500 g of copper powder serving as a heat sink. This mixture was introduced into a steel tube and then was subjected to impact compression using an amount of explosive set to provide a temperature of 1900° C. and an impact pressure of 40 GPa, thereby synthesizing each of the cubic Ce-SiAlONs corresponding to sintered materials No. 5A to No. 5E. After the impact compression, the mixed powder in the steel tube was taken out and the copper powder was removed by acid cleaning, thereby obtaining each of the synthetic powders corresponding to sintered materials No. 5A to No. 5E.

Each of these synthetic powders was analyzed using the X-ray diffractometer (trademark: "MiniFlex600" provided by Rigaku) under the same conditions as the conditions for the analysis of the reaction product from which NaCl had been removed, thereby identifying cubic Ce—SiAlON (JCPDS card: 01-074-3494) and β-Ce—SiAlON (JCPDS card: 01-077-0755). From the X-ray diffraction pattern of the synthetic powder, the following peak intensities were calculated: a peak intensity Ic (311) for a (311) plane, which is a main peak of the cubic Ce—SiAlON; and a peak intensity Iβ (200) for a (200) plane, which is a main peak of the β Ce—SiAlON. Rc thereof was calculated from the formula (1) above. As a result, Rc was as shown in Table 5. From the description above, it was determined that the cubic Ce—SiAlON could be synthesized in each of the synthetic powders corresponding to sintered materials No. 5A to No. 5E.

Further, for each of the above-described synthetic powders, an ICP emission spectrophotometer (trademark: "iCAP 6500 DUO" provided by Thermo Fischer Scientific Inc.) was used to find a ratio of a metallic element in the Ce—SiAlON powder using a high-frequency inductively-coupled-plasma emission spectroscopy method. An oxygen-nitrogen analyzer (trademark: "ONH 836" provided by LECO Japan Corporation) was used to find a ratio of oxygen element in the Ce—SiAlON powder using an inert-gas-fusion non-distributed infrared absorption method and find a ratio of nitrogen element in the Ce—SiAlON powder using an inert-gas-fusion thermal conductivity method. As a result, it was confirmed that the values of x and z of each of the synthetic powders corresponding to sintered materials No. 5A to No. 5E were substantially the same as the values of x and z converted from the corresponding starting material.

Each of the five sintered materials No. 5A to No. 5E was produced in the same manner as the production of sintered material No. 1C (i.e., with a sintering temperature of 1500° C.) of Example 1 except that the second material in each of the sintered materials was changed as shown in Table 5. Based on the obtained X-ray diffraction pattern of each sintered material by the X-ray diffractometer under the above-described conditions, peak intensity ratio Rc in each sintered material was calculated from the formula (1) above. It was confirmed that peak intensity ratio Rc coincided with that in the above-described synthetic powder.

Further, from sintered materials No. 5A to No. 5E, cutting tools each having the same shape as that in Example 1 were produced. By using each of the cutting tools, the same cutting test as that in Example 1 was performed. The results are shown in Table 5 below.

Here, for each of sintered materials No. 5A to No. 5E, the same method as that in Example 1 was employed to specify the locations of existence of the $Al_2O_3$ in the first material and calculate the equivalent circle diameter (grain size) and content (volume %) of the $Al_2O_3$. As a result, it was confirmed that the grain size of the first material was about 2 μm, the grain size of the $Al_2O_3$ was 0.1 μm, the locations of existence of the $Al_2O_3$ were in the crystal grain boundaries or the crystal grains, and the content ratio of the $ZrO_2$ and the $Al_2O_3$ in the sintered material was substantially the same as that when blending for the source material.

Further, based on a reflection electron image obtained by measuring a CP-processed surface of each sintered material using an SEM, regions of the SiAlON, the $ZrO_2$ and the $Al_2O_3$ were identified and areas of the regions were measured by a binarization process employing the above-described image analysis software. As a result, it was confirmed that the composition and content of each of the SiAlON, the $ZrO_2$, and the $Al_2O_3$ were substantially the same as those when blending for the source material.

TABLE 5

| Sintered Material No. | Second Material = Ce—SiAlON Atomic Ratio x of Ce | Rc (%) | Cutting Distance (km) | Cause of Reached Life |
|---|---|---|---|---|
| 5A | 0 | 92 | 2.4 | Chipping |
| 5B | 0.1 | 91 | 3.2 | Chipping |
| 5C | 1.0 | 85 | 3.7 | Wear |
| 5D | 1.8 | 81 | 2.6 | Wear |
| 5E | 2.2 | 75 | 1.0 | Wear |

From Table 5, it was found that each of the cutting tools of sintered materials No. 5B to No. 5D each including Ce—SiAlON in which x=0.1 to 1.8 achieved an extended cutting distance and had an improved life as compared with the cutting tool of sintered material No. 5A not including Ce in the SiAlON of the second material. This is presumably because the chipping resistance in processing a difficult-to-cut material was improved more due to the inclusion of Ce. However, the cutting tool of sintered material No. 5E including the Ce—SiAlON in which x=2.2 is worn out relatively faster than the cutting tools of sintered materials No. 5B to No. 5D.

Example 6

First, there were prepared: Ti powder (trademark: "TC-200" provided by Toho Titanium Co., Ltd; average particle size of 17 μm); Zr powder (trademark: "zirconium (powder) <–40μ>" provided by Mitsuwa Chemicals Co., Ltd; particle size of not more than 40 μm; purity of not less than 98%); Fe powder (trademark: "ultra fine pure iron powder" provided by JFE Steel Corporation; average particle size of 1 μm); $Y_2O_3$ powder (trademark: "fine particle product (high BET product)" provided by Nippon Yttrium Co., Ltd; average grain size of 1 μm); CaO powder (trademark: "calcium oxide" provided by Kojundo Chemical Laboratory; purity of 99.8%); and the Si powder, Al powder, and $SiO_2$ powder, which were used during the synthesis of the Ce—SiAlON. In the present example, these powders were selected appropriately and blended to synthesize M-SiAlON represented by $M_xSi_{6-x-z}Al_zO_zN_{8-z}$ where x was 0.2 and z was 2, thereby obtaining starting materials of sintered materials No. 6A to No. 6E. Further, synthetic powder of M-SiAlON represented by $M_{0.2}Si_{3.8}Al_2O_2N_6$ in which Rc was as shown in Table 6 below was obtained under the same conditions as those in Example 5 except that a metallic source material shown in Table 6 was used instead of Ce.

The five sintered materials No. 6A to No. 6E were produced in the same manner as the production of sintered material No. 1C (i.e., with a sintering temperature of 1500° C.) of Example 1 except that the second material in each of the sintered materials was changed as shown in Table 6. Further, based on the obtained X-ray diffraction pattern of each of the sintered materials by the X-ray diffractometer, peak intensity ratio Rc in the sintered material was calculated from the formula (1) above. It was confirmed that peak intensity ratio Rc coincided with that in the above-described synthetic powder.

From sintered materials No. 6A to No. 6E, cutting tools each having the same shape as that in Example 1 were produced. By using each of the cutting tools, the same cutting test as that in Example 1 was performed. The results are shown in Table 6 below.

Here, for each of sintered materials No. 6A to No. 6E, the same method as that in Example 1 was employed to specify the locations of existence of the $Al_2O_3$ in the first material and calculate the equivalent circle diameter (grain size) and content of the $Al_2O_3$. As a result, it was confirmed that the grain size of the first material was about 2 μm, the grain size of the $Al_2O_3$ was 0.1 μm, the locations of existence of the $Al_2O_3$ were in the crystal grain boundaries or the crystal grains, and the content ratio of the $ZrO_2$ and $Al_2O_3$ in the sintered material was substantially the same as that when blending for the source material.

Further, based on a reflection electron image obtained by measuring a CP-processed surface of each sintered material using an SEM, regions of the SiAlON, the $ZrO_2$ and the $Al_2O_3$ were identified and areas of the regions were measured by a binarization process employing the above-described image analysis software. As a result, it was confirmed that the composition and content of each of the SiAlON, the $ZrO_2$, and the $Al_2O_3$ were substantially the same as those when blending for the source material.

TABLE 6

| Sintered Material No. | Second Material = M—SiAlON Metal Type and Atomic Ratio of M | Rc (%) | Cutting Distance (km) | Cause of Reached Life |
|---|---|---|---|---|
| 6A | $M_x = Ti_{0.2}$ | 89 | 3.8 | Chipping |
| 6B | $M_x = Zr_{0.2}$ | 86 | 3.7 | Chipping |
| 6C | $M_x = Fe_{0.2}$ | 85 | 3.4 | Wear |
| 6D | $M_x = Y_{0.2}$ | 78 | 3.5 | Wear |
| 6E | $M_x = Ca_{0.2}$ | 82 | 3.4 | Wear |
| 5A | $M_x = Ce_0$ | 92 | 2.4 | Chipping |

From Table 6, it is understood that each of the cutting tools of sintered materials No. 6A to No. 6E each including the M-SiAlON in which x was 0.2 achieved a remarkably extended cutting distance, had very excellent chipping resistance in processing a difficult-to-cut material, and had a significantly improved tool life as compared with the cutting tool of sintered material No. 5A including the M-SiAlON in which x was 0.

Example 7

10 sintered materials No. 7A to No. 7J were produced in the same manner as in the production of sintered material No. 1C of Example 1 except that the β-SiAlON (content: 90 volume %) in the sintered material was replaced with 60 volume % of β-SiAlON and the third phase (content: 30 volume % of the total of one or two compounds) shown in Table 7.

As the source material of the third phase, there were employed: cBN powder (trademark: "SBN-F G1-3" provided by Showa Denko K.K.; average particle size of 1.5 µm); TiC powder (trademark: "TiC-01" provided by Japan New Materials Co., Ltd; average particle size of 1 µm); TiCN powder (trademark: "TiN—TiC 50/50" provided by Japan New Materials Co., Ltd; average particle size of 1 µm); ZrN powder (trademark: "ZrN-1" provided by Japan New Materials Co., Ltd.); AlN powder (trademark: "AlN-E grade" provided by Tokuyama Corporation; average particle size of 1 µm), $Al_2O_3$ powder (trademark: "AA-1.5" provided by Sumitomo Chemical Co., Ltd; average particle size of 1.6 µm); $Cr_2N$ powder (trademark: "$Cr_2N$—O" provided by Japan New Materials Co., Ltd; average particle size of 5 µm); WC powder (trademark: "WC-10" provided by Japan New Materials Co., Ltd; average particle size of 1 µm); and Co powder (trademark: "HMP" provided by Umicore; average particle size of 0.5 µm). From these powders, powders were selected appropriately and blended, thereby obtaining source materials for sintered materials No. 7A to No. 7J.

From sintered materials No. 7A to No. 7J, cutting tools each having the same shape as that in Example 1 were produced. By using each of the cutting tools, the same cutting test as that in Example 1 was performed. The results are shown in Table 7 below.

Also, for each of sintered materials No. 7A to No. 7J, the same method as that in Example 1 was employed to specify the locations of existence of $Al_2O_3$ in the first material and calculate the equivalent circle diameter (grain size) and content of $Al_2O_3$. As a result, it was confirmed that each of sintered materials No. 7A to No. 7J was similar to sintered material No. 1C of Example 1 (grain size: 0.1 µm; content: 15 volume %; the locations of existence were in the crystal grain boundaries or the crystal grains).

Further, based on a reflection electron image obtained by measuring a CP-processed surface of each sintered material using an SEM, regions of the SiAlON, the $ZrO_2$ and the $Al_2O_3$ were identified and areas of the regions were measured by a binarization process employing the above-described image analysis software. As a result, it was confirmed that the composition and content of each of the β-SiAlON, the first material, and the third phase were substantially the same as those when blending for the source material.

TABLE 7

| Sintered Material No. | First Material $ZrO_2$—$Al_2O_3$ | Second Material β-SiAlON | Third Phase | | | | | | | | | Cutting Distance (km) | Cause of Reached Life |
|---|---|---|---|---|---|---|---|---|---|---|---|---|---|
| | | | cBN | TiC | TiCN | ZrN | AlN | $Al_2O_3$ | $Cr_2N$ | WC | Co | | |
| 1C | 10 | 90 | — | — | — | — | — | — | — | — | — | 1.6 | Chipping |
| 7A | 10 | 60 | 30 | — | — | — | — | — | — | — | — | 1.5 | Wear |
| 7B | 10 | 60 | — | 30 | — | — | — | — | — | — | — | 1.9 | Chipping |
| 7C | 10 | 60 | — | — | 30 | — | — | — | — | — | — | 1.6 | Wear |
| 7D | 10 | 60 | — | — | — | 30 | — | — | — | — | — | 1.5 | Wear |
| 7E | 10 | 60 | — | — | — | — | 30 | — | — | — | — | 1.5 | Chipping |
| 7F | 10 | 60 | — | — | — | — | — | 30 | — | — | — | 1.4 | Chipping |
| 7G | 10 | 60 | — | — | — | — | — | — | 30 | — | — | 1.5 | Chipping |
| 7H | 10 | 60 | — | — | — | — | — | — | — | 20 | 10 | 1.7 | Wear |
| 7I | 10 | 60 | 15 | 15 | — | — | — | — | — | — | — | 2.0 | Chipping |
| 7J | 10 | 60 | 15 | — | 15 | — | — | — | — | — | — | 2.2 | Wear |

As apparent from Table 7, it was confirmed that the cutting tool produced from any one of the sintered materials has excellent toughness, excellent wear resistance, and very excellent chipping resistance in processing a difficult-to-cut material.

As described above, the embodiments and examples of the present invention have been illustrated, but it has been initially expected to appropriately combine configurations of the embodiments and examples.

The embodiments and examples disclosed herein are illustrative and non-restrictive in any respect. The scope of the present invention is defined by the terms of the claims, rather than the embodiments and examples described above, and is intended to include any modifications within the scope and meaning equivalent to the terms of the claims.

The invention claimed is:
1. A sintered material comprising a first material and a second material, the first material being partially stabilized $ZrO_2$ having a crystal grain boundary or crystal grain in which 5 to 90 volume % of $Al_2O_3$ is dispersed with respect to a whole of the first material, the second material including at least one of SiAlON, silicon nitride and titanium nitride, the sintered material including 1 to 50 volume % of the first material.

2. The sintered material according to claim 1, wherein the $Al_2O_3$ has a grain size of not more than 1 μm.

3. The sintered material according to claim 1, wherein the $Al_2O_3$ has a grain size of not more than 0.5 μm.

4. The sintered material according to claim 1, wherein the $Al_2O_3$ has a grain size of not more than 0.1 μm.

5. The sintered material according to claim 1, wherein both or one of the SiAlON and the silicon nitride have/has a cubic crystal structure.

6. The sintered material according to claim 5, wherein both or one of the SiAlON and the silicon nitride further have/has at least one of an α crystal structure and a β crystal structure, and a peak intensity ratio Rc is not less than 20%, the peak intensity ratio Rc representing a ratio of an intensity of a main peak of an X-ray diffraction of the cubic crystal structure to a total of respective intensities of main peaks of X-ray diffractions of the α crystal structure, the β crystal structure, and the cubic crystal structure.

7. The sintered material according to claim 1, wherein each of the SiAlON and the silicon nitride is represented by $M_xSi_{6-x-z}Al_zO_zN_{8-z}$, the M includes at least one metal selected from a group consisting of calcium, strontium, barium, scandium, yttrium, lanthanoid, manganese, iron, cobalt, nickel, copper, a group 4 element, a group 5 element, and a group 6 element in a periodic table, and an atomic ratio of each of the elements of the $M_xSi_{6-x-z}Al_zO_zN_{8-z}$ satisfies $0.01 \leq x \leq 2$, $0 \leq z \leq 4.2$ and $1.79 \leq 6-x-z \leq 5.99$.

8. The sintered material according to claim 1, wherein the sintered material further includes a third phase, and the third phase is a compound composed of: at least one element selected from a group consisting of a group 4 element, a group 5 element, a group 6 element in a periodic table, boron, and Al; and at least one element selected from a group consisting of nitrogen, carbon, oxygen, and boron, or the third phase is a solid solution of the compound.

9. A cutting tool comprising the sintered material recited in claim 1.

* * * * *